(12) United States Patent
Li et al.

(10) Patent No.: US 11,075,371 B2
(45) Date of Patent: Jul. 27, 2021

(54) NEGATIVE ELECTRODE FOR SECONDARY LITHIUM METAL BATTERY AND METHOD OF MAKING

(71) Applicant: GM GLOBAL TECHNOLOGY OPERATIONS LLC, Detroit, MI (US)

(72) Inventors: Binsong Li, Troy, MI (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 123 days.

(21) Appl. No.: 16/229,149

(22) Filed: Dec. 21, 2018

(65) Prior Publication Data

US 2020/0203710 A1     Jun. 25, 2020

(51) Int. Cl.
| | |
|---|---|
| *H01M 4/134* | (2010.01) |
| *H01M 4/1395* | (2010.01) |
| *H01M 10/0525* | (2010.01) |
| *H01M 4/38* | (2006.01) |
| *H01M 4/02* | (2006.01) |

(52) U.S. Cl.
CPC ......... *H01M 4/134* (2013.01); *H01M 4/1395* (2013.01); *H01M 4/382* (2013.01); *H01M 10/0525* (2013.01); *H01M 2004/027* (2013.01)

(58) Field of Classification Search
CPC ...... H01M 4/134; H01M 4/1395; H01M 4/38; H01M 4/382; H01M 10/0525
See application file for complete search history.

(56) References Cited

U.S. PATENT DOCUMENTS

| | | | |
|---|---|---|---|
| 8,974,946 B2 | 3/2015 | Cai et al. | |
| 9,123,939 B2 | 9/2015 | Xiao et al. | |
| 9,160,036 B2 | 10/2015 | Yang et al. | |
| 9,252,411 B2 | 2/2016 | Abd Elhamid et al. | |
| 9,302,914 B2 | 4/2016 | Liu et al. | |
| 9,362,552 B2 | 6/2016 | Sohn et al. | |
| 9,373,829 B2 | 6/2016 | Xiao et al. | |
| 9,437,871 B2 | 9/2016 | Zhou et al. | |
| 9,537,144 B2 | 1/2017 | Huang et al. | |
| 9,742,028 B2 | 8/2017 | Zhou et al. | |
| 9,896,763 B2 | 2/2018 | Dadheech et al. | |
| 9,905,847 B2 | 2/2018 | Dadheech et al. | |
| 9,923,189 B2 | 3/2018 | Xiao | |
| 9,929,435 B2 | 3/2018 | Cai et al. | |

(Continued)

FOREIGN PATENT DOCUMENTS

| | | |
|---|---|---|
| CN | 111354945 A | 6/2020 |
| DE | 102019115704 A1 | 6/2020 |

*Primary Examiner* — Karie O'Neill Apicella
(74) *Attorney, Agent, or Firm* — Harness, Dickey & Pierce, P.L.C.

(57) ABSTRACT

A negative electrode for an electrochemical cell of a secondary lithium metal battery may comprise a metal substrate, a lithium metal layer overlying a major surface of the metal substrate, and a protective interfacial layer formed on a major surface of the lithium metal layer over the metal substrate. The protective interfacial layer may comprise a stack of monomolecular layers including at least one aryl siloxane monomolecular layer overlying the major surface of the lithium metal layer. The protective interfacial layer may be formed on the major surface of the lithium metal layer by applying a mixture of monoaryl silanes to the major surface of the lithium metal layer.

20 Claims, 2 Drawing Sheets

(56) References Cited

U.S. PATENT DOCUMENTS

| | | |
|---|---|---|
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,431,849 B2 | 10/2019 | Yersak et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 2008/0069944 A1* | 3/2008 | Muldoon ............ H01M 4/0421 427/58 |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2016/0111721 A1 | 4/2016 | Xiao et al. |
| 2016/0172706 A1 | 6/2016 | Xiao et al. |
| 2016/0172710 A1 | 6/2016 | Liu et al. |
| 2016/0336621 A1* | 11/2016 | Yokomizo ......... H01M 10/0567 |
| 2017/0271678 A1 | 9/2017 | Yang et al. |
| 2019/0341615 A1 | 11/2019 | Xiao et al. |
| 2019/0372155 A1 | 12/2019 | Yersak et al. |
| 2019/0393549 A1 | 12/2019 | Yersak et al. |
| 2020/0052338 A1 | 2/2020 | Liu et al. |
| 2020/0127282 A1 | 4/2020 | Yersak et al. |

\* cited by examiner

NEGATIVE ELECTRODE FOR SECONDARY LITHIUM METAL BATTERY AND METHOD OF MAKING

INTRODUCTION

A battery is a device that converts chemical energy into electrical energy via electrochemical reduction-oxidation (redox) reactions. In secondary or rechargeable batteries, these electrochemical reactions are reversible, which allows the batteries to undergo multiple charging and discharging cycles.

Secondary lithium batteries generally comprise one or more electrochemical cells that include a negative electrode, a positive electrode, a porous separator, an electrolyte, a negative current collector, and a positive current collector. Such batteries are powered by the cooperative movement of lithium ions and electrons between the negative and positive electrodes of each electrochemical cell. The electrolyte is ionically conductive and provides a medium for the conduction of the lithium ions through the electrochemical cell between the negative and positive electrodes. The current collectors are electrically conductive and allow the electrons to simultaneously travel from one electrode to another via an external circuit. The porous separator physically separates and electrically insulates the electrodes from each other while permitting free ion flow therebetween.

Lithium metal is a desirable negative electrode material for secondary lithium metal batteries because it has the highest specific capacity (3,860 mAh/g) and the lowest electrochemical potential of any negative electrode material for Li-based batteries (−3.04 V versus the standard hydrogen electrode). When lithium metal is used as the negative electrode material in a battery, the lithium metal in the negative electrode is oxidized to lithium ions ($Li^+$) during discharge of the battery and the lithium ions travel from the negative electrode, through the electrolyte, to the positive electrode, where the lithium ions are stored. When the battery is recharged, the lithium ions are released from the positive electrode and travel from the positive electrode, through the electrolyte, and back to the negative electrode, where the lithium ions are reduced to lithium metal and re-deposited.

An electrically insulating and ionically conductive passivation layer called a solid electrolyte interphase (SEI) may inherently form in-situ on a surface of the negative electrode at an interface between the negative electrode and the electrolyte during the initial charging and discharging cycles of the battery. Formation of the SEI may prevent further physical contact and undesirable chemical reactions between the lithium metal in the negative electrode and the electrolyte during operation of the battery, which may improve the stability of the negative electrode. In addition, the SEI may help ensure the even distribution and deposition of lithium ions on the negative electrode during battery recharge, which may help prevent lithium dendrite nucleation and growth on the negative electrode and may improve the Coulombic efficiency of the battery. However, formation of the SEI is believed to result from decomposition of the electrolyte and the consumption of active lithium, which may lead to capacity fading, increased battery resistance, and poor power density. Therefore, there is a need in the art for a method of forming an electrically insulating and ionically conductive interfacial layer between the negative electrode and the electrolyte that does not consume active lithium or degrade the electrolyte and also can maintain its physical integrity during the repeated discharging and charging cycles of the battery.

SUMMARY

A negative electrode for an electrochemical cell of a secondary lithium metal battery may comprise a metal substrate, a lithium metal layer overlying a major surface of the metal substrate, and a protective interfacial layer formed on a major surface of the lithium metal layer over the metal substrate. The protective interfacial layer may comprise a stack of monomolecular layers including at least one aryl siloxane monomolecular layer overlying the major surface of the lithium metal layer.

The protective interfacial layer may exhibit a laterally and axially ordered structure, and wherein the ordered structure of the protective interfacial layer may be stabilized by non-covalent electrostatic interactions between neighboring aryl groups.

The at least one aryl siloxane monomolecular layer may comprise a plurality of aryl siloxane molecules, with each aryl siloxane molecule comprising a first aryl group located at a first end thereof and a second aryl group located at an opposite second end thereof.

The protective interfacial layer may comprise an aryl silanolate monomolecular layer covalently bonded to the lithium metal layer, and wherein the at least one aryl siloxane monomolecular layer may be formed on the major surface of the lithium metal layer over the aryl silanolate monomolecular layer.

A first axial end of the at least one aryl siloxane monomolecular layer may be positioned adjacent to the aryl silanolate monomolecular layer such that non-covalent interactions occur between the first end of the at least one aryl siloxane monomolecular layer and the aryl silanolate monomolecular layer. A second end of the at least one aryl siloxane monomolecular layer may extend in an upright direction away from the aryl silanolate monomolecular layer.

The aryl silanolate monomolecular layer may comprise a plurality of aryl silanolate molecules, with each aryl silanolate molecule being covalently bonded to the lithium metal layer at a first end thereof and including an aryl group at an opposite terminal end thereof.

The plurality of aryl silanolate molecules may be uniformly spaced apart from one another on the surface of the lithium metal layer, and wherein a molecular chain axis of each of the plurality of aryl silanolate molecules may be oriented normal to, or within 30° of normal to; a plane defined by the major surface of the lithium metal layer.

The at least one aryl siloxane monomolecular layer may comprise a plurality of aryl siloxane molecules of formula (C1):

(C1)

wherein $Ar_1$ and $Ar_2$ may be independently the same or different and are an aryl group, and wherein $R_1$, $R_2$, $R_3$, and $R_4$ may be independently the same or different and may be hydrogen or a $C_1$-$C_6$ acyclic alkyl group.

The aryl group may be a substituted or unsubstituted phenyl, biphenyl, terphenyl, naphthyl, anthracenyl, pyrenyl, perylenyl, thiophenyl, cyclopentadienyl, tropylium, benzyl, phenethyl, or 3-(pyren-1-yl)propyl group.

The $C_1$-$C_6$ acyclic alkyl group may be a methyl, ethyl, propyl, isopropyl, butyl, isobutyl, or tert-butyl group.

The plurality of aryl siloxane molecules may be uniformly spaced apart from one another, and wherein a molecular chain axis of each of the plurality of aryl siloxane molecules may be oriented normal to, or within 30° of normal to, a plane defined by the major surface of the lithium metal layer.

In one form, the protective interfacial layer may comprise an aryl silanolate monomolecular layer covalently bonded to the lithium metal layer, a first aryl siloxane monomolecular layer overlying the aryl silanolate monomolecular layer, and a second aryl siloxane monomolecular layer overlying the first aryl siloxane monomolecular layer. In such case, non-covalent interactions may occur between the first aryl siloxane monomolecular layer and the aryl silanolate monomolecular layer, and non-covalent interactions may occur between the second aryl siloxane monomolecular layer and the first aryl siloxane monomolecular layer.

An electrochemical cell of a secondary lithium metal battery may comprise a positive electrode, a negative electrode, and an electrolyte. The positive electrode may include a positive electrode active material layer electrically coupled to a metal positive electrode current collector. The negative electrode may comprise a metal substrate, a lithium metal layer overlying a major surface of the metal substrate, and a protective interfacial layer formed on a major surface of the lithium metal layer over the metal substrate. The electrolyte may be in ionic contact with the positive and negative electrodes. The protective interfacial layer may define an interface between the lithium metal layer of the negative electrode and the electrolyte.

A secondary lithium metal battery may include a plurality of electrochemical cells. The electrochemical cells may be connected in a series or parallel arrangement.

In a method of manufacturing a negative electrode for an electrochemical cell of a secondary lithium metal battery, an electrically conductive metal substrate may be provided. The electrically conductive metal substrate may have a lithium metal layer formed thereon. The lithium metal layer may include a plurality of hydroxyl groups disposed on a major surface thereof. A mixture of aryl silanes may be applied to the major surface of the lithium metal layer to form a protective interfacial layer on the major surface of the lithium metal layer. The protective interfacial layer may comprise a stack of monomolecular layers including at least one aryl siloxane monomolecular layer overlying the major surface of the lithium metal layer.

The mixture of aryl silanes may comprise at least one silane of formula (C2):

(C2)

wherein Ar may be an aryl group, wherein $R_1$ and $R_2$ may be independently the same or different and may be hydrogen or a $C_1$-$C_6$ acyclic alkyl group, and wherein X may be a halogen.

The aryl group may be a substituted or unsubstituted phenyl, biphenyl, terphenyl, naphthyl, anthracenyl, pyrenyl, perylenyl, thiophenyl, cyclopentadienyl, tropylium, benzyl, phenethyl, or 3-(pyren-1-yl)propyl group.

The $C_1$-$C_6$ acyclic alkyl group may be a methyl, ethyl, propyl, isopropyl, butyl, isobutyl, or tert-butyl group.

The halogen may comprise chlorine.

The mixture of aryl silanes may comprise at least one silane selected from the group consisting of: chloro(dimethyl)phenylsilane, chlorodimethyl(pentafluorophenyl)silane, chloro(methyl)phenylsilane, chlorodimethylphenethylsilane, benzylchlorodimethylsilane, chloro(dimethyl)(3-phenoxyphenyl)silane, chloro(dimethyl)[3-(pyren-1-yl)propyl]silane, or chlorodimethyl(2,3,4,5-tetramethyl-2,4-cyclopentadien-1-yl)silane.

DETAILED DESCRIPTION

The negative electrode described herein is configured for use in an electrochemical cell of a secondary lithium metal battery and includes a layer of lithium metal as a negative electrode active material, instead of a lithium intercalation material. During manufacture of the negative electrode, a protective interfacial layer comprising an ordered stack of monomolecular layers is formed over a major surface of the lithium metal layer by application of a monoaryl silane to the surface of the lithium metal layer. The as-formed protective interfacial layer comprises at least one aryl siloxane monomolecular layer overlying the major surface of the lithium metal layer. In assembly, the protective interfacial layer formed on the major surface of the lithium metal layer creates a protective, electrically insulating and ionically conductive interface between the lithium metal layer and an ionically conductive electrolyte disposed between the negative electrode and an opposing positive electrode. The protective interfacial layer physically isolates the lithium metal layer from the electrolyte and prevents the occurrence of undesirable chemical reactions therebetween. Formation of the protective interfacial layer on the major surface of the lithium metal layer does not consume active lithium, does not degrade the electrolyte, and allows lithium ions ($Li^+$) to effectively pass therethrough during cycling of the lithium metal battery.

The protective interfacial layer formed on the major surface of the lithium metal layer exhibits relatively high rigidity and stability, as compared to solid electrolyte interphase layers that may inherently form in-situ during cycling of conventional lithium ion and/or lithium metal batteries.

As such, the protective interfacial layer can effectively accommodate the inherent expansion and contraction of the lithium metal layer that results from the repeated plating and stripping of lithium ions during the discharging and charging cycles of the lithium metal battery. In addition, the protective interfacial layer can maintain its physical integrity during the repeated passage of lithium ions therethrough, which can increase the cycle life of the battery.

Figure 1:
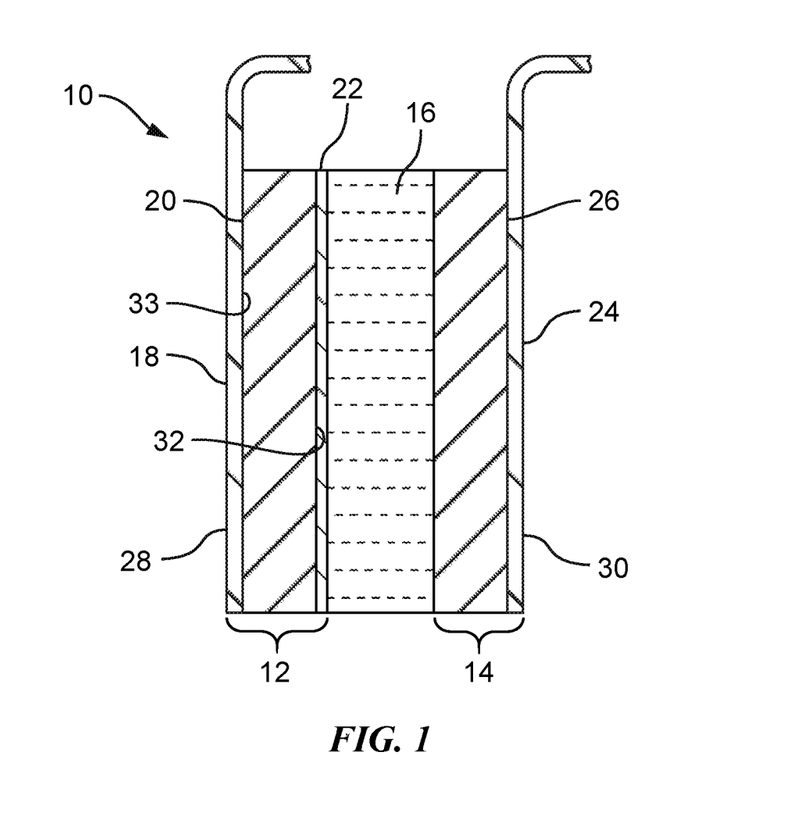
FIG. 1 is a schematic side cross-sectional view of an electrochemical cell for a secondary lithium metal battery comprising a negative electrode, a positive electrode, and an electrolyte in ionic contact with the negative and positive electrodes, wherein the negative electrode includes a negative electrode current collector, a lithium metal layer formed on a major surface of the negative electrode current collector, and a protective interfacial layer formed on a major surface of the lithium metal layer.

FIG. 1 illustrates in idealized fashion a cross-sectional view of an electrochemical cell 10 of a secondary lithium metal battery (not shown). The electrochemical cell 10 comprises a negative electrode 12, a positive electrode 14, and an electrolyte 16 in ionic contact with the negative electrode 12 and the positive electrode 14. The negative electrode 12 includes a negative electrode current collector 18, a negative electrode active material layer in the form of a lithium metal layer 20 formed on the negative electrode current collector 18, and a protective interfacial layer 22 formed on the lithium metal layer 20. The positive electrode 14 includes a positive electrode current collector 24 having a positive electrode active material layer 26 formed on the positive electrode current collector 24. The negative and positive electrodes 12, 14 are spaced apart from one another and, in assembly, may be physically separated from one another by a porous separator (not shown). In assembly, the negative electrode 12 may be electrically coupled to the positive electrode 14 via an external circuit (not shown) so that electrons can flow between the negative and positive electrodes 12, 14 while lithium ions simultaneously travel through the electrolyte 16 between the lithium metal layer 20 and the opposing positive electrode active material layer 26 during cycling of the electrochemical cell 10.

The electrochemical cell 10 may have a thickness, measured from an outer surface 28 of the negative electrode 12 to an opposite outer surface 30 of the positive electrode 14 of less than 100 micrometers to about one millimeter. Individually, the negative and positive electrodes 12, 14 may have thicknesses of up to 200 micrometers, with each of the current collectors 18, 24 having a thickness of in the range of one micrometer to 30 micrometers.

The electrolyte 16 may comprise any material that is capable of effectively conducting lithium ions between the negative and positive electrodes 12, 14. For example, the electrolyte 16 may comprise a non-aqueous liquid electrolyte. In such case, the electrolyte 16 may comprise a solution including a lithium salt dissolved or ionized in a nonaqueous, aprotic organic solvent or a mixture of nonaqueous, aprotic organic solvents. Examples of lithium salts that may be used to make the electrolyte 16 comprise a lithium cation ($Li^+$) and one or more of the following anions: $ClO_4^-$, $AlCl_4^-$, $I^-$, $Br^-$, $SCN^-$, $BF_4^-$, $B(C_6H_5)_4^-$, $AsF_6^-$, $CF_3SO_3^-$, $N(CF_3SO_2)_2^-$, and $PF_6^-$. The nonaqueous, aprotic organic solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture thereof. As another example, the electrolyte 16 may comprise a gel or plasticized polymer electrolyte. In such case, the electrolyte 16 may comprise a polymer host material soaked with a liquid electrolyte solution. Some examples of polymer host materials include poly(vinylidene) (PVdF), poly(acrylonitrile) (PAN), poly(methyl methacrylate) (PMMA), poly(ethylene oxide) (PEO), polyacrylates, and poly(vinylidene fluoride-hexafluoropropylene) (PVdF-HFP).

When present, the porous separator disposed between the negative and positive electrodes 12, 14 may comprise any material that can physically separate and electrically insulate the electrodes 12, 14 from one another while permitting the free flow of lithium ions therebetween. For example, the porous separator may comprise non-woven materials or microporous polymeric materials. In particular, the porous separator may comprise a single polyolefin or a combination of polyolefins, such as polyethylene (PE), polypropylene (PP), polyamide (PA), poly(tetrafluoroethylene) (PTFE), polyvinylidine fluoride (PVdF), and/or poly(vinyl chloride) (PVC). In one form, the porous separator may comprise a laminate of one or more polymeric materials, such as a laminate of PE and PP.

The negative electrode current collector 18 may be in the form of a thin and flexible porous or non-porous electrically conductive metal substrate and may comprise any material that is capable of collecting and reversibly passing free electrons to and from the lithium metal layer 20. For example, the negative electrode current collector 18 may comprise an electrically conductive metal or metal alloy, e.g., a transition metal or alloy thereof. In some specific examples, the negative electrode current collector 18 may comprise copper (Cu), nickel (Ni), an iron (Fe) alloy (e.g., stainless steel), or titanium (Ti). Other electrically conductive metals may of course be used, if desired.

The lithium metal layer 20 may be physically bonded to a major surface 33 of the negative electrode current collector 18. The lithium metal layer 20 may comprise a lithium metal alloy or may consist essentially of lithium (Li) metal. For example, the lithium metal layer 20 may comprise, by weight, greater than 97% lithium or, more preferably, greater than 99% lithium. As such, the lithium metal layer 20 preferably does not comprise any other elements or compounds that undergo a reversible redox reaction with lithium during operation of the electrochemical cell 10. For example, the lithium metal layer 20 preferably does not comprise an intercalation host material that is formulated to undergo the reversible insertion or intercalation of lithium ions or an alloying material that can electrochemically alloy and form compound phases with lithium. In addition, the lithium metal layer 20 preferably does not comprise a conversion material or an alloy material that can electrochemically alloy and form compound phases with lithium. Some examples of materials that are preferably excluded from the lithium metal layer 20 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybedenum oxide), metal phosphides, metal sulfides, and metal nitrides (e.g., phosphides, sulfides, and/or nitrides or iron, manganese, nickel, copper, and/or cobalt). In addition, the lithium metal layer 20 preferably does not comprise a polymeric binder. Some examples of polymeric binders that are preferably excluded from the lithium metal layer 20 of the present disclosure include polyvinylidene fluoride (PVdF), ethylene propylene diene monomer (EPDM) rubber, styrene butadiene rubber (SBR), carboxymethyl cellulose (CMC), and polyacrylic acid.

The protective interfacial layer 22 is formed on and over a major surface 32 of the lithium metal layer 20, over the negative electrode current collector 18. The protective interfacial layer 22 passivates the major surface 32 of the lithium metal layer 20 and provides a protective interface between the lithium metal layer 20 and the electrolyte 16 by preventing physical contact and undesirable chemical reactions between the lithium metal layer 20 and the electrolyte 16, while allowing lithium ions to effectively pass therethrough. The term "passivates" as used herein refers to the formation of a layer overlying the surface 32 of the lithium metal layer 20 that makes the surface 32 of the lithium metal layer 20 less reactive with the electrolyte 16. When used in connection with the protective interfacial layer 22, the term "passivates" refers to a layer that is not intrinsically formed on the surface of the lithium metal layer 20 and is not formed in situ on the surface of the lithium metal layer 20 during battery operation. The protective interfacial layer 22 may have a thickness in the range of 10 nanometers to 500 nanometers, or more preferably, in the range of 50 nanometers to 100 nanometers.

In FIG. 1, a first lithium metal layer 20 is formed on a first major surface 33 of the negative electrode current collector 18 and a first protective interfacial layer 22 is formed on a major surface 32 of the first lithium metal layer 20 over the first major surface 33 of the negative electrode current collector 18. In other embodiments, a first lithium metal layer 20 may be formed on a first major surface 33 of the negative electrode current collector 18 and a second lithium metal layer (not shown) may be formed on an opposite second major surface (not shown) of the negative electrode current collector 18. In such case, a second protective interfacial layer (not shown) may be formed on a major surface of the second lithium metal layer over the second major surface of the negative electrode current collector 18.

Figure 2:
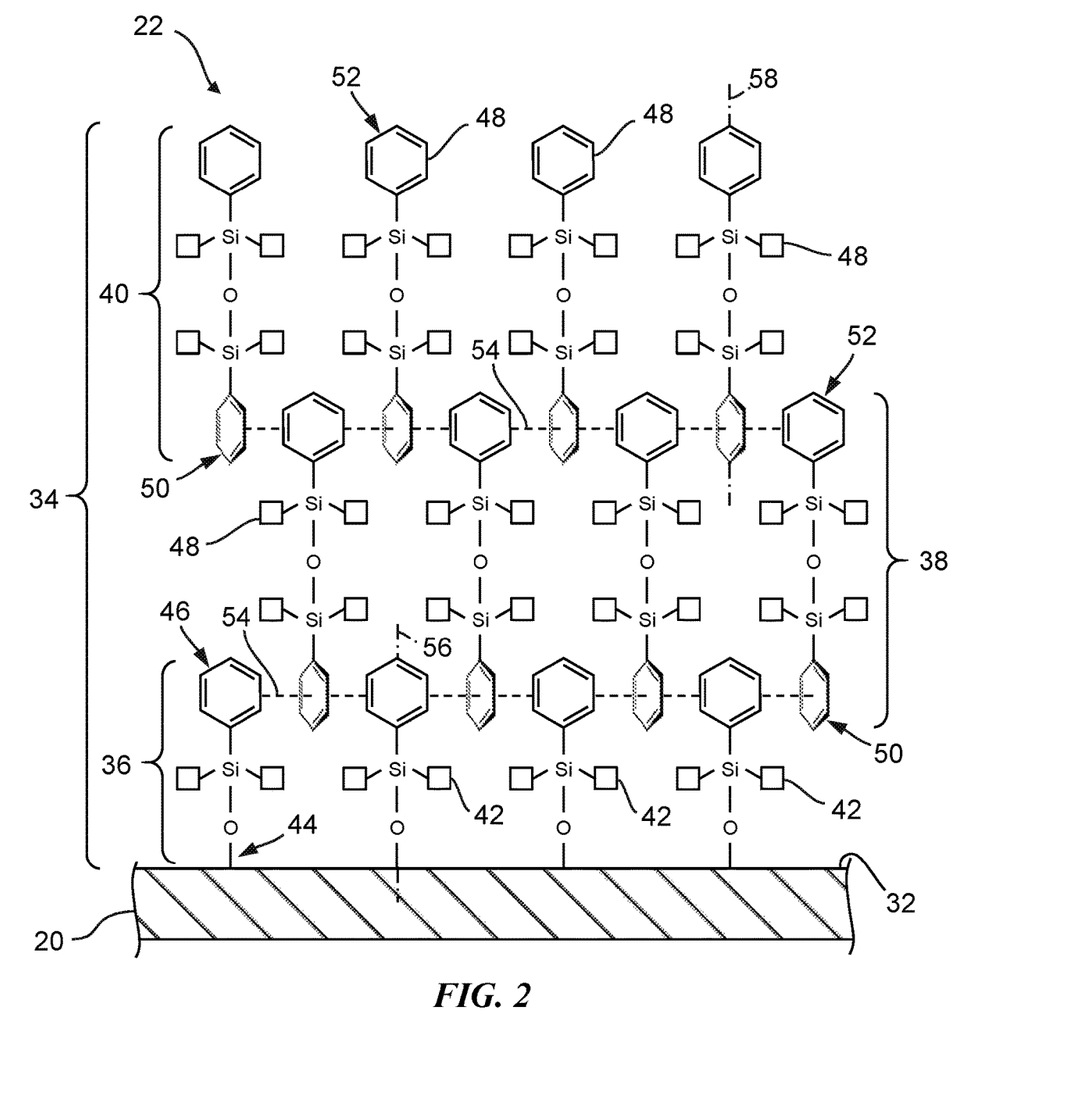
FIG. 2 is an enlarged view of a portion of the lithium metal layer and the protective interfacial layer of FIG. 1, wherein the protective interfacial layer comprises an ordered stack of monomolecular layers including an aryl silanolate layer and formed on the major surface of the lithium metal layer and first and second aryl siloxane layers overlying the aryl silanolate layer.

Referring now to FIG. 2, the protective interfacial layer 22 comprises an ordered stack 34 of monomolecular layers overlying the major surface 32 of the lithium metal layer 20. The ordered stack 34 includes an aryl silanolate layer 36 formed on the major surface 32 of the lithium metal layer 20, a first aryl siloxane layer 38 overlying the aryl silanolate layer 36, and a second aryl siloxane layer 40 overlying the first aryl siloxane layer 38. Each of the layers 36, 38, 40 comprises a single layer of molecules aligned along a plane oriented parallel to the major surface 32 of the lithium metal layer 20 and thus may be referred to as monomolecular layers. In the embodiment depicted in FIG. 2, the protective interfacial layer 22 comprises two aryl siloxane layers 38, 40 overlying the aryl silanolate layer 36 on the major surface 32 of the lithium metal layer 20. In other embodiments, the protective interfacial layer 22 may comprise more than two aryl siloxane monomolecular layers stacked one on top of the other on the major surface 32 of the lithium metal layer 20.

The aryl silanolate layer 36 is uniformly distributed over the surface 32 of the lithium metal layer 20 and comprises a plurality of ordered aryl silanolate molecules 42 having a first end 44 covalently bonded to the surface 32 of the lithium metal layer 20 and an opposite terminal end 46 extending away from the surface 32 of the lithium metal layer 20. The aryl silanolate layer 36 exhibits an ordered structure, with the aryl silanolate molecules 42 being assembled in a uniform relationship relative to one another on the surface 32 of the lithium metal layer 20, as opposed to being randomly distributed in a disordered manner over the surface 32 of the lithium metal layer 20. In particular, the aryl silanolate molecules 42 exhibit an ordered structure in a lateral direction (parallel to the surface 32 of the lithium metal layer 20) by being generally uniformly spaced apart from one another on the surface 32 of the lithium metal layer 20. In addition, the aryl silanolate molecules 42 exhibit an ordered structure in an axial direction (normal to the surface 32 of the lithium metal layer 20) by being oriented in an upright direction with respect to the surface 32 of the lithium metal layer 20. For example, each of the aryl silanolate molecules 42 may have a defined molecular chain axis 56 oriented normal to a plane defined by the surface 32 of the lithium metal layer 20, or within about 30° of normal.

Each of the aryl silanolate molecules 42 comprises an aryl lithium (Li) silanolate molecule of formula (1):

(1)

wherein Ar is an aryl group and $R_1$ and $R_2$ are independently the same or different and are hydrogen or a $C_1$-$C_6$ acyclic alkyl group. In FIG. 2, the aryl groups of the aryl silanolate molecules 42 are represented by phenyl groups and the $R_1$ and $R_2$ groups are represented by squares (□). The aryl groups of the aryl silanolate molecules 42 may comprise phenyl groups or other planar ring systems, as described below.

The $R_1$ and $R_2$ groups in each of the aryl silanolate molecules 42 may be the same or different and may comprise hydrogen or a $C_1$-$C_6$ acyclic alkyl group having 1 to 6 carbon atoms. The term "alkyl" as used herein (alone or in combination with other terms) refers to a linear or branched saturated hydrocarbon group described by the formula $C_nH_{2n+1}$. Example $C_1$-$C_6$ acyclic alkyl groups include methyl (—$CH_3$), ethyl (—$CH_2CH_3$), propyl (—$CH_2CH_2CH_3$), isopropyl (—$CH(CH_3)_2$), butyl (—$CH_2CH_2CH_2CH_3$), isobutyl (—$CH_2CH(CH_3)_2$), and tert-butyl (—$C(CH_3)_3$).

The term "aryl" as used herein (alone or in combination with other terms) refers to a planar ring system with delocalized π(pi) electrons. An aryl group may comprise a carbocyclic aromatic system with one or more aromatic rings of carbon atoms in its molecular structure or a heterocylic aromatic system with one or more aromatic rings in its molecular structure that include both a carbon atom and a heteroatom (e.g., N, O, and/or S). An "aryl" for the purposes of this disclosure may include 1 to 7 aromatic rings, wherein when the number of rings is greater than one, the rings may be attached together in a pendent manner or may be fused together. Example aryl groups include phenyl (—$C_6H_5$), biphenyl (—$C_6H_5C_6H_5$), terphenyl ((—$C_6H_5)_3$), naphthyl (—$C_{10}H_7$), anthracenyl (—$C_{14}H_9$), pyrenyl (—$C_{16}H_9$), perylenyl (—$C_{20}H_{11}$), thiophenyl (—$C_4H_3S$), cyclopentadienyl (—$C_5H_5$), or tropylium (—$C_7H_7$). In some embodiments, an "aryl" may comprise an aryl-alkyl group including an alkylene chain (e.g., methylene (—$CH_2$—), ethylene (—$CH_2CH_2$—), or propylene (—$CH(CH_3)CH_2$—)) attached to an aryl group. Example aryl-alkyl groups include benzyl groups (—$CH_2C_6H_5$), phenethyl groups (—$CH_2CH_2C_6H_5$), and 3-(pyren-1-yl)propyl groups.

An "aryl" may be substituted or unsubstituted. The term "substituted" as used herein (alone or in combination with other terms) refers to the replacement of one or more hydrogen atoms in a group with a substituent (an atom or a group of atoms) other than hydrogen. In a substituted aryl, one or more hydrogen atoms in the ring system are replaced by a substituent other than hydrogen. Example substituents include halogens and aryl, alkyl, alkoxy, and aryloxy groups. Example alkyl group substituents include $C_1$-$C_6$ acyclic alkyl groups, as described above. The term "halogen" as used herein (alone or in combination with other terms) refers to an element of Group 17 (Group VIIA) of the periodic table, e.g., fluorine (F), chlorine (Cl), bromine (Br), and/or iodine (I). The term "alkoxy" as used herein (alone or in combination with other terms) refers to an alkyl group singularly bonded to an oxygen atom and described by the formula $C_nH_{2n+1}O$. Example alkoxy groups include methoxy (—$OCH_3$) and ethoxy (—$OCH_2CH_3$). The term "aryloxy" as used herein (alone or in combination with other terms) refers to an aryl group singularly bonded to an oxygen atom. An example aryloxy is phenoxy (—$OC_6H_5$). Example substituted aryl groups include fluorophenyl, pentafluorophenyl, 4-methoxyphenyl, 2,3,4,5-tetramethyl-2,4-cyclopentadien-1-yl, and 3-phenoxyphenyl.

The first and second aryl siloxane layers 38, 40 each comprise a plurality of ordered aryl siloxane molecules 48 having a first axial end 50 adjacent the aryl silanolate layer 36 and an opposite second axial end 52 extending away from the aryl silanolate layer 36. The aryl siloxane layers 38, 40 exhibit an ordered structure, with the aryl siloxane molecules 48 being assembled in a uniform relationship relative to one another, as opposed to being randomly distributed in a disordered manner. In particular, the aryl siloxane molecules 48 exhibit an ordered structure in a lateral direction (parallel to the surface 32 of the lithium metal layer 20) by being generally uniformly spaced apart from one another in the lateral direction. In addition, the aryl siloxane molecules 48 exhibit an ordered structure in an axial direction (normal to the surface 32 of the lithium metal layer 20) by being oriented in an upright direction with respect to the surface 32 of the lithium metal layer 20. For example, each of the aryl siloxane molecules 48 may have a defined molecular chain axis 58 oriented normal to a plane defined by the surface 32 of the lithium metal layer 20, or within about 30° of normal.

Each of the aryl siloxane molecules 48 is of formula (2):

(2)

wherein $Ar_1$ and $Ar_2$ are independently the same or different and are an aryl group, as described above, and wherein $R_1$, $R_2$, $R_3$, and $R_4$ are independently the same or different and are hydrogen or a $C_1$-$C_6$ acyclic alkyl group, as described above. In FIG. 2, the aryl groups of the aryl siloxane molecules 48 are represented by phenyl groups and the $R_1$, $R_2$, $R_3$, and $R_4$ groups are represented by squares (□).

Without intending to be bound by theory, it is believed that the presence of the aryl groups in the aryl silanolate molecules 42 of the aryl silanolate layer 36 and the aryl siloxane molecules 48 of the first and second aryl siloxane layers 38, 40 may provide the protective interfacial layer 22 with a high elastic modulus, as compared to silanolate layers and/or siloxane layers that do not include aryl groups. As such, the protective interfacial layer 22 described herein may help suppress or prevent the formation and/or growth of lithium dendrites on the surface 32 of the lithium metal layer 20 during cycling of the electrochemical cell 10. In addition, the high elastic strength of the protective interfacial layer 22 may allow the layer 22 to maintain its physical integrity in spite of the large volumetric changes in the lithium metal layer 20 during cycling of the electrochemical cell 10.

As shown in FIG. 2, the aryl groups of the aryl silanolate molecules 42 are located at the terminal end 46 thereof, and the aryl groups of the aryl siloxane molecules 48 are located at both the first and second axial ends 50, 52 thereof. As such, the aryl groups of the aryl silanolate molecules 42 are positioned adjacent to (neighboring) and in an at least partially overlapping relationship with the aryl groups at the first axial ends 50 of the aryl siloxane molecules 48 in the first aryl siloxane layer 38. In addition, the aryl groups at the second axial ends 52 of the aryl siloxane molecules 48 in the first aryl siloxane layer 38 are positioned adjacent to (neighboring) and in an at least partially overlapping relationship with the aryl groups at the first axial ends 50 of the aryl siloxane molecules 48 in the second aryl siloxane layer 40.

Without intending to be bound by theory, it is believed that, at least in some instances, the ordered structure of the aryl silanolate layer 36 and/or of the first and second aryl siloxane layers 38, 40 may be attributed to non-covalent electrostatic interactions between neighboring aryl groups in and between the layers 36, 38, 40. More specifically, due to the aromatic character of the aryl groups in the aryl silanolate molecules 42 and the aryl siloxane molecules 48 (due to the inherent adjacent, parallel, overlapping p orbitals and delocalized π-system of electrons), a partial negative charge may exist on the planar faces of the aryl groups and a partial positive charge may exist around the periphery of the aryl groups. As such, the regions of negative electrostatic potential (the faces of the aryl groups) in the silanolate molecules 42 and the aryl siloxane molecules 48 may interact with regions of positive electrostatic potential (the peripheries of the aryl groups) in neighboring molecule(s), and such interactions may promote the formation and maintenance of a laterally ordered structure between the aryl silanolate molecules 42 in the aryl silanolate layer 36 and between the aryl siloxane molecules 48 of the first and second aryl siloxane layers 38, 40. At the same time, the regions of negative electrostatic potential in the molecules 42, 48 of the respective layers 36, 38, 40 may interact with the regions of positive electrostatic potential in the molecules 42, 48 of adjacent overlapping layer(s), and such interactions may promote the formation and maintenance of an axially ordered structure between the aryl silanolate layer 36 and the first and second aryl siloxane layers 38, 40. The dashed lines (54) between adjacent molecules 42, 48 in the overlapping layers 36, 38, 40 indicate the location of non-covalent edge-to-face π-interactions between the aryl groups of the adjacent molecules 42, 48.

The negative electrode 12, including the negative electrode current collector 18, the lithium metal layer 20, and the protective interfacial layer 22, may be manufactured using a chemical deposition method. In such case, an electrically conductive metal substrate may be provided having a lithium metal layer formed on a major surface thereof. A major surface of the lithium metal layer may comprise, or may be treated to comprise, a plurality of oxygen-containing reactive sites, e.g., hydroxyl (—OH) groups. The lithium metal layer may be treated to comprise a plurality of hydroxyl (—OH) groups, for example, by exposing the lithium metal layer to an oxygen-containing environment. In practice, the surface of the lithium metal layer also may comprise lithium oxide ($Li_2O$).

To form a protective interfacial layer 22 (FIG. 2) on the major surface of the lithium metal layer, a mixture of monoaryl silanes is applied to the surface of the lithium metal layer. The monoaryl silanes may be applied to the major surface of the lithium metal layer, for example, by spraying, dip coating, spin coating, or any other suitable process. In some instances, the monoaryl silanes may be dispersed in an organic solvent prior to being applied to the major surface of the lithium metal layer.

The monoaryl silanes applied to the surface of the lithium metal layer are of formula (3):

(3)

wherein Ar is an aryl group, $R_1$ and $R_2$ are independently the same or different and are hydrogen or a $C_1$-$C_6$ acyclic alkyl group (as described above), and X is a reactive group. Example reactive groups include halogens (as described above). In one form, X is chlorine.

Specific examples of monoaryl silanes include chloro(dimethyl)phenylsilane, chlorodimethyl(pentafluorophenyl)silane, chloro(methyl)phenylsilane, chlorodimethylphenethylsilane, benzylchlorodimethylsilane, chloro(dimethyl)(3-phenoxyphenyl)silane, chloro(dimethyl)[3-(pyren-1-yl)propyl]silane, chlorodimethyl(2,3,4,5-tetramethyl-2,4-cyclopentadien-1-yl)silane, and combinations thereof.

Upon contact with the reactive sites (e.g., —OH groups) on the surface of the lithium metal layer, some of the monoaryl silanes covalently bond to the surface of the lithium metal layer by formation of an oxane bond (—O—) between the silicon (Si) atoms of the silanes and the surface of the lithium metal layer. Such reactions result in the formation of aryl lithium silanolate molecules 42 and a self-assembled aryl silanolate monomolecular layer 36 (FIG. 2) on the surface of the lithium metal layer. Some of the lithium silanolate molecules 42 may further react with additional monoaryl silanes to form aryl siloxane molecules 48 (FIG. 2). The aryl siloxane molecules 48 may self-assemble on the surface of the lithium metal layer over the aryl silanolate layer 36 and may orient themselves in an upright direction with respect to the surface of the lithium metal layer to form one or more self-assembled aryl siloxane monomolecular layers 38, 40 (FIG. 2) stacked one over the other on the surface of the lithium metal layer.

Formation of the aryl silanolate layer 36 and the aryl siloxane layers 38, 40 on the surface of the lithium metal layer may result in the formation of hydrogen (H) and/or lithium (Li)-containing by-products represented by the following formula: H—X and/or LiX, where X is a reactive group, e.g., a halogen. Example by-products include hydrochloric acid (HCl) and lithium chloride (LiCl). Without intending to be bound by theory, it is believed that when HCl is produced as a by-product, the HC may further react with lithium oxide on the surface of the lithium metal layer to form LiCl. LiCl by-products may remain within the aryl silanolate layer 36 and/or the aryl siloxane layers 38, 40 or may be washed from the layers 36, 38, 40 using an inert organic solvent. For example, after formation, the aryl silanolate layer 36 and the aryl siloxane layers 38, 40 may be rinsed with tetrahydrofuran (THF), dioxolane (DOL), or a combination thereof.

After formation of the aryl silanolate layer 36 and the aryl siloxane layers 38, 40 on the surface of the lithium metal layer over the electrically conductive metal substrate, the metal substrate may be formed into one or more negative electrodes exhibiting a desired size and shape. The as-formed negative electrodes may be employed in the subsequent manufacture of one or more electrochemical cells of a secondary lithium metal battery. In such case, the aryl silanolate layer 36 and the aryl siloxane layers 38, 40 may form a protective interfacial layer between a lithium metal layer and an electrolyte in the electrochemical cells.

EXPERIMENTAL

Negative electrode samples including lithium metal as the negative electrode active material were prepared in a laboratory environment and the lithium (Li) stripping and plating processes on the negative electrodes were evaluated within Li—Li symmetric cells via galvanostatic cycling. To prepare the negative electrode samples, surfaces of lithium (Li) metal foils were: (1) treated with an alkyl chlorosilane, (2) treated with an aryl chlorosilane, or (3) left untreated for comparison. The alkyl chlorosilane was trimethylchlorosilane (TMCS). The aryl chlorosilane was chloro(dimethyl)phenylsilane (PhDMCS) or chlorodimethyl(pentafluorophenyl)silane (F5PhDMCS). As discussed above, treating the surfaces of the Li metal foils with an alkyl chlorosilane or an aryl chlorosilane (e.g., by applying the liquid alkyl or aryl chlorosilanes to the surfaces of the Li metal foils) is believed to result in the formation of a protective interfacial layer on the surfaces of the Li metal foils. The protective interfacial layer formed on the surfaces of the Li metal foils is believed to comprise an ordered stack of monomolecular layers, including a lithium silanolate layer formed directly on the surface of the Li metal foils and one or more siloxane layers formed on the surface of the Li metal foils over the lithium silanolate layer.

The as-prepared lithium metal foils were formed into disks and assembled into Li—Li symmetric cells using 2032-type coin cells (MTI). The electrolyte employed in the symmetric cells was 1M lithium hexafluorophosphate ($LiPF_6$) dissolved in a mixture of ethylene carbonate (EC) and diethyl carbonate (DEC) (1:2 w/w) with 10 wt % fluoroethylene carbonate (FEC) as additive. The electrolyte in each symmetric cell was 40 µL/cm². Celgard 2320 (20 µm PP/PE/PP) were used as separators. The cycling performance of the as-prepared Li—Li symmetric cells was evaluated at different current densities.

Li—Li symmetric cells were prepared and cycled at a current density of 0.5 mA/cm² and areal capacity of 2 mAh/cm². The cycle life of the Li—Li symmetric cell prepared with the untreated Li metal foil was about 250 hours. The cycle life of the Li—Li symmetric cell prepared with the TMCS-treated Li metal foil was about 350 hours. The cycle life of the Li—Li symmetric cell prepared with the F5PhDMCS-treated Li metal foil was about 400 hours. The cycle life of the Li—Li symmetric cell prepared with the PhDMCS-treated Li metal foil was about 470 hours. In sum, the cycle life of the cells prepared with aryl chlorosilane-treated Li metal foils was notably longer than the cycle life of the cells prepared with alkyl chlorosilane-treated Li metal foils or with untreated Li metal foils.

Li—Li symmetric cells were prepared and cycled at a current density of 1 mA/cm$^2$ and areal capacity of 4 mAh/cm$^2$. The cycle life of the Li—Li symmetric cell prepared with the untreated Li metal foil was about 120 hours. The cycle life of the Li—Li symmetric cell prepared with the TMCS-treated Li metal foil was about 140 hours. The cycle life of the Li—Li symmetric cell prepared with the F5PhDMCS-treated Li metal foil was about 240 hours. The cycle life of the Li—Li symmetric cell prepared with the PhDMCS-treated Li metal foil was about 270 hours. In sum, the cycle life of the cells prepared with aryl chlorosilane-treated Li metal foils was notably longer than the cycle life of the cells prepared with alkyl chlorosilane-treated Li metal foils or with untreated Li metal foils.

Without intending to be bound by theory, it is believed that the improved cycle life of the cells prepared with aryl chlorosilane-treated Li metal foils, as compared to cells prepared with alkyl chlorosilane-treated Li metal foils or with untreated Li metal foils, may be due to the presence of the aryl groups (i.e., the phenyl (Ph) groups) in the siloxane layers formed on the surface of the aryl chlorosilane-treated Li metal foils.

When cycled at current densities of 0.5 mA/cm$^2$ and 1 mA/cm$^2$, the cells prepared with the PhDMCS-treated Li metal foils exhibited a longer cycle life than the cells prepared with the F5PhDMCS-treated Li metal foils. It is believed that this difference in cycle life may be due to the substitution of fluorine (F) atoms for hydrogen (H) atoms on the aryl groups (i.e., the phenyl (Ph) groups) in the siloxane layers formed on the surface of the F5PhDMCS-treated Li metal foils, as compared to the PhDMCS-treated Li metal foils. Without intending to be bound by theory, it is believed that the substitution of fluorine (F) atoms for hydrogen (H) atoms on the phenyl (Ph) groups of the F5PhDMCS-treated Li metal foils may weaken the electrostatic interactions between the aryl groups (i.e., the phenyl (Ph) groups) in the siloxane layers formed on the surface of the F5PhDMCS-treated Li metal foils, as compared to the electrostatic interactions between the phenyl groups of the PhDMCS-treated Li metal foils. More specifically, it is believed that the substitution of fluorine (F) atoms for hydrogen (H) atoms on the phenyl (Ph) groups in the siloxane layers formed on the surface of the F5PhDMCS-treated Li metal foils may diminish the difference in charge between the negatively charged planar faces of the phenyl groups and the positively charged peripheries of the phenyl groups.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A negative electrode for an electrochemical cell of a secondary lithium metal battery, the negative electrode comprising:
    a metal substrate;
    a lithium metal layer overlying a major surface of the metal substrate; and
    a passivated protective interfacial layer formed on a major surface of the lithium metal layer over the metal substrate,
    wherein the passivated protective interfacial layer comprises a stack of monomolecular layers including at least two aryl siloxane monomolecular layers overlying the major surface of the lithium metal layer.

2. The negative electrode of claim 1 wherein the protective interfacial layer exhibits a laterally and axially ordered structure, and wherein the ordered structure of the protective interfacial layer is stabilized by non-covalent electrostatic interactions between neighboring aryl groups.

3. The negative electrode of claim 1 wherein each of the at least two aryl siloxane monomolecular layers comprises a plurality of aryl siloxane molecules, with each aryl siloxane molecule comprising a first aryl group located at a first end thereof and a second aryl group located at an opposite second end thereof.

4. The negative electrode of claim 1 wherein the protective interfacial layer comprises an aryl silanolate monomolecular layer covalently bonded to the lithium metal layer, and wherein the at least two aryl siloxane monomolecular layers is formed on the major surface of the lithium metal layer over the aryl silanolate monomolecular layer.

5. The negative electrode of claim 4 wherein a first end of each of the at least two aryl siloxane monomolecular layers is positioned adjacent to the aryl silanolate monomolecular layer such that non-covalent interactions occur between the first end of each of the at least two aryl siloxane monomolecular layers and the aryl silanolate monomolecular layer, and wherein a second end of the at least two aryl siloxane monomolecular layers extends in an upright direction away from the aryl silanolate monomolecular layer.

6. The negative electrode of claim 4 wherein the aryl silanolate monomolecular layer comprises a plurality of aryl silanolate molecules, with each aryl silanolate molecule being covalently bonded to the lithium metal layer at a first end thereof and including an aryl group at an opposite terminal end thereof.

7. The negative electrode of claim 6 wherein the plurality of aryl silanolate molecules are uniformly spaced apart from one another on the surface of the lithium metal layer, and wherein a molecular chain axis of each of the plurality of aryl silanolate molecules is oriented normal to, or within 30° of normal to, a plane defined by the major surface of the lithium metal layer.

8. The negative electrode of claim 1 wherein each of the at least two aryl siloxane monomolecular layers comprises a plurality of aryl siloxane molecules of formula (C1):

(C1)

wherein Ar$_1$ and Ar$_2$ are independently the same or different and are an aryl group, and wherein R$_1$, R$_2$, R$_3$, and R$_4$ are independently the same or different and are hydrogen or a C$_1$-C$_6$ acyclic alkyl group.

9. The negative electrode of claim 8 wherein the aryl group is a substituted or unsubstituted phenyl, biphenyl, terphenyl, naphthyl, anthracenyl, pyrenyl, perylenyl, thiophenyl, cyclopentadienyl, tropylium, benzyl, phenethyl, or 3-(pyren-1-yl)propyl group.

10. The negative electrode of claim 8 wherein the $C_1$-$C_6$ acyclic alkyl group is a methyl, ethyl, propyl, isopropyl, butyl, isobutyl, or tert-butyl group.

11. The negative electrode of claim 8 wherein the plurality of aryl siloxane molecules are uniformly spaced apart from one another, and wherein a molecular chain axis of each of the plurality of aryl siloxane molecules is oriented normal to, within 30° of normal to, a plane defined by the major surface of the lithium metal layer.

12. The negative electrode of claim 1 wherein the protective interfacial layer comprises an aryl silanolate monomolecular layer covalently bonded to the lithium metal layer, a first aryl siloxane monomolecular layer overlying the aryl silanolate monomolecular layer, and a second aryl siloxane monomolecular layer overlying the first aryl siloxane monomolecular layer, wherein non-covalent interactions occur between the first aryl siloxane monomolecular layer and the aryl silanolate monomolecular layer, and wherein non-covalent interactions occur between the second aryl siloxane monomolecular layer and the first aryl siloxane monomolecular layer.

13. An electrochemical cell of a secondary lithium metal battery, the electrochemical cell comprising:
a positive electrode including a positive electrode active material layer electrically coupled to a metal positive electrode current collector;
a negative electrode as set forth in claim 1; and
an electrolyte in ionic contact with the positive and negative electrodes,
wherein the protective interfacial layer defines an interface between the lithium metal layer of the negative electrode and the electrolyte.

14. A secondary lithium metal battery including a plurality of electrochemical cells as set forth in claim 13, wherein the electrochemical cells are connected in a series or parallel arrangement.

15. A method of manufacturing a negative electrode for an electrochemical cell of a secondary lithium metal battery, the method comprising:
providing an electrically conductive metal substrate having a lithium metal layer formed thereon, the lithium metal layer including a plurality of hydroxyl groups disposed on a major surface thereof;
applying a mixture of aryl silanes to the major surface of the lithium metal layer to form a passivated protective interfacial layer on the major surface of the lithium metal layer,
wherein the passivated protective interfacial layer comprises a stack of monomolecular layers including at least two aryl siloxane monomolecular layers overlying the major surface of the lithium metal layer.

16. The method of claim 15 wherein the mixture of aryl silanes comprises at least one silane of formula (C2):

(C2)

wherein Ar is an aryl group,
wherein $R_1$ and $R_2$ are independently the same or different and are hydrogen or a $C_1$-$C_6$ acyclic alkyl group, and
wherein X is a halogen.

17. The method of claim 16 wherein the aryl group is a substituted or unsubstituted phenyl, biphenyl, terphenyl, naphthyl, anthracenyl, pyrenyl, perylenyl, thiophenyl, cyclopentadienyl, tropylium, benzyl, phenethyl, or 3-(pyren-1-yl)propyl group.

18. The method of claim 16 wherein the $C_1$-$C_6$ acyclic alkyl group is a methyl, ethyl, propyl, isopropyl, butyl, isobutyl, or tert-butyl group.

19. The method of claim 16 wherein the halogen comprises chlorine.

20. The method of claim 16 wherein the mixture of aryl silanes comprises at least one silane selected from the group consisting of: chloro(dimethyl)phenylsilane, chlorodimethyl(pentafluorophenyl)silane, chloro(methyl)phenyl silane, chlorodimethylphenethylsilane, benzylchlorodimethylsilane, chloro(dimethyl)(3-phenoxyphenyl)silane, chloro(dimethyl)[3-(pyren-1-yl)propyl]silane, or chlorodimethyl(2,3,4,5-tetramethyl-2,4-cyclopentadien-1-yl)silane.

* * * * *